United States Patent
Anaya Calvo et al.

(10) Patent No.: US 12,270,372 B2
(45) Date of Patent: Apr. 8, 2025

(54) MODULAR WIND TURBINE BLADE WITH LIGHTNING PROTECTION SYSTEM

(71) Applicant: VESTAS WIND SYSTEMS A/S, Aarhus N (DK)

(72) Inventors: Julian Anaya Calvo, Valladolid (ES); Nathan A. Brilliant, Arvada, CO (US); Toby Collard, Cowes (GB); Lasse Lykkegaard, Herning (DK)

(73) Assignee: VESTAS WIND SYSTEMS A/S, Aarhus N (DK)

( * ) Notice: Subject to any disclaimer, the term of this patent is extended or adjusted under 35 U.S.C. 154(b) by 0 days.

(21) Appl. No.: 18/720,055

(22) PCT Filed: Dec. 13, 2022

(86) PCT No.: PCT/DK2022/050278
§ 371 (c)(1),
(2) Date: Jun. 14, 2024

(87) PCT Pub. No.: WO2023/110043
PCT Pub. Date: Jun. 22, 2023

(65) Prior Publication Data
US 2025/0059946 A1 Feb. 20, 2025

Related U.S. Application Data

(60) Provisional application No. 63/289,325, filed on Dec. 14, 2021.

(30) Foreign Application Priority Data

Jan. 11, 2022 (DK) .............................. PA202270013

(51) Int. Cl.
*F03D 1/06* (2006.01)
*F03D 80/30* (2016.01)

(52) U.S. Cl.
CPC ........... *F03D 1/0681* (2023.08); *F03D 80/30* (2016.05); *F05B 2240/32* (2013.01); *F05B 2240/85* (2020.08)

(58) Field of Classification Search
CPC ....... F03D 1/0681; F03D 80/30; F03D 1/0677
See application file for complete search history.

(56) References Cited

U.S. PATENT DOCUMENTS

2010/0329865 A1 12/2010 Hibbard
2019/0055921 A1* 2/2019 Danielsen ............. F03D 1/0675
(Continued)

FOREIGN PATENT DOCUMENTS

EP 2243955 A2 10/2010
WO 2020084050 A1 4/2020
(Continued)

OTHER PUBLICATIONS

Danish Patent and Trademark Office, 1st Technical Examination including The Search Report for Application PA 2022 70013 dated Jul. 8, 2022.
(Continued)

*Primary Examiner* — Brian O Peters
(74) *Attorney, Agent, or Firm* — Patterson + Sheridan, LLP

(57) ABSTRACT

A wind turbine blade having at least two blade modules extending in the spanwise direction of the blade and being configured for connection end-to-end at a connection joint An electromagnetic shield is positioned in electrically conductive contact with the blade modules and extending across the connection joint in the spanwise direction.

17 Claims, 9 Drawing Sheets

(56) References Cited

U.S. PATENT DOCUMENTS

| | | |
|---|---|---|
| 2021/0215133 A1 | 7/2021 | Smith |
| 2021/0239101 A1 | 8/2021 | Bech et al. |
| 2021/0332789 A1 | 10/2021 | Aldinger |
| 2021/0381493 A1* | 12/2021 | Aubrion .................. F03D 80/30 |

FOREIGN PATENT DOCUMENTS

| | | |
|---|---|---|
| WO | 2020089074 A1 | 5/2020 |
| WO | 2021008666 A1 | 1/2021 |

OTHER PUBLICATIONS

PCT International Search Report and Written Opinion of The International Searching Authority for Application PCT/DK2022/050278 dated Apr. 24, 2023 (Apr. 24, 2023).

\* cited by examiner

MODULAR WIND TURBINE BLADE WITH LIGHTNING PROTECTION SYSTEM

TECHNICAL FIELD

The present invention relates generally to a wind turbine blade and in particular to the lightning protection system of a modular wind turbine blade.

BACKGROUND

Providing a wind turbine with larger blades increases the swept area of the rotor, allowing the wind turbine to capture increased amounts of energy from the wind. However, wind farms are typically situated in remote locations which may be difficult to access. As such, transporting large wind turbine blades to a wind farm site can be difficult. Some modern wind turbine blades are therefore designed as a modular assembly comprising two or more blade modules. The modules may be transported separately before being assembled to form the wind turbine blade on-site.

Wind turbines are susceptible to lightning strikes, and the blades of wind turbines are particularly susceptible to lightning strikes. As a result, it is common for a wind turbine blade to include a lighting protection system to receive a lightning strike and safely discharge the lightning current to ground. One particular challenge of a modular blade is ensuring that lightning current is transferred across a joint between adjacent blade modules without causing damage to the blade at the joint.

It is against this background that the present invention has been developed.

SUMMARY OF INVENTION

According to the present invention there is provided a wind turbine blade extending longitudinally in a spanwise direction between a root end and a tip end, and extending in a chordwise direction between a leading edge and a trailing edge, the blade comprising:
- a first blade module having a first spar cap portion extending in the spanwise direction of the blade, the first spar cap portion comprising electrically conductive fibres;
- a second blade module having a second spar cap portion extending in the spanwise direction of the blade, the second spar cap portion comprising electrically conductive fibres;
- the first spar cap portion and the second spar cap portion each having an outer surface facing towards an exterior of the blade, an inner surface facing towards an interior of the blade, a first side surface facing towards the leading edge of the blade and a second side surface facing towards the trailing edge of the blade
- the first blade module and the second blade module being configured for connection end-to-end via their respective spar caps portion at a connection joint;
- wherein an electromagnetic shield is positioned on and in electrically conductive contact with at least one surface of the first spar cap portion and at least one surface of the second spar cap portion, the electromagnetic shield extending across the connection joint in the spanwise direction.

Together the first spar cap portion and the second spar cap portion make a spar cap of the wind turbine blade.

The presence of a connection joint in a conductive spar cap breaks the electrical continuity in the conductive fibres of the spar cap. The electromagnetic shield which extends across the connection joint protects the spar cap in the event of a lightning strike. In particular, in a blade where the spar cap is formed from a conductive material, the electromagnetic shield mitigates against the risk of voltage flashovers across the connection joint by isolating the connection joint from the majority of the lightning current.

The electromagnetic shield locally shields the connection joint in the conductive spar cap. The electromagnetic shield is in intimate contact with the surfaces of the spar cap portions. The electromagnetic shield is not intended to protect the spar cap portions from direct lightning attachment. Instead, the electromagnetic shield provides local shielding at the joint area by preventing the formation of high electric fields at the joint and thus minimising the risk of any flashovers. The electromagnetic shield should be in intimate contact with the surfaces of the spar cap portions so that current can pass from the spar cap portions to the electromagnetic shield.

The electromagnetic shield may be applied to any type of connection joint, including an adhesively bonded joint and a mechanically (e.g. bolted) connected joint. The wind turbine blade may comprise a root module and a tip module that are connected together at the connection joint. However, the blade may have more than one connection joint and the electromagnetic shield may be applied to each connection joint.

In the event of a lightning strike, lightning current may flow in the spar cap. The current in the spar cap will be diverted into the electromagnetic shield as this has a lower impendence than the spar cap, in particular due to the skin effect. This avoids high currents across the connection joint in the spar cap as the majority of the lightning current is carried by the electromagnetic shield which acts as a low impedance path. This in turn avoids heating at the connection joint (whether it is an adhesive joint or a mechanical joint) which prevents damage to the connection joint. In particular, damage to composite, adhesive or metal parts by overheating is avoided.

Preferably the conductive material comprises carbon fibres. For example, the spar cap portions may comprise carbon fibre reinforced plastic (CFRP). The spar cap portions may include pultruded fibrous strips of material such as pultruded carbon fibre composite material or other carbon fibre reinforced plastic material.

Preferably, the electromagnetic shield is positioned on the upper surface and/or the inner surface of each of the first and second spar cap portions. The upper surface and the inner surface may define major surfaces of the spar cap portions and in this way, lightning current can be transferred to and from the spar cap portions into the electromagnetic shield over a large surface area.

The electromagnetic shield may be positioned on the first side surface and/or the second side surface of each of the first and second spar cap portions. Providing the electromagnetic shield in this way helps to ensure that lightning current can be transferred between the spar cap portions and the electromagnetic shield.

The electromagnetic shield may comprise a layer that extends unbroken across the connection joint. This helps to ensure that the majority of the lightning current is transferred across the connection joint and bypasses the connection joint.

The electromagnetic shield may comprise a first shield portion positioned on the first spar cap portion and a second shield portion positioned on the second spar cap portion. The first shield portion and the second shield portion may be in contact with each other at the connection joint. The first shield portion and the second shield portion may overlap at the connection joint. By providing the electromagnetic shield in a modular form, i.e. in first and second portions, facilitates the assembly of the wind turbine blade at the connection joint.

The first shield portion and the second shield portion may be both positioned on the outer surface or the inner surface of the first and second spar cap portions respectively, and the first and second shield portions may be separated from each other in the spanwise direction; a third shield portion is positioned across the connection joint on the other of the outer surface or the inner surface such that the third shield portion is separated from the first and second shield portions by a thickness of the spar cap; the third shield portion overlaps, in projection, with the first shield portion and the second shield portion in the spanwise direction of the blade. By providing the electromagnetic shield in this modular form, i.e. in first, second and third portions, also facilitates the assembly of the wind turbine blade at the connection joint and reduces the amount of material needed for the electromagnetic shield.

A third shield portion may be provided wherein the first shield portion and the second shield portion are electrically connected via a third shield portion at the connection joint, the third shield portion being in electrical contact with both the first and second shield portions. By providing the electromagnetic shield in this modular form will also facilitate the assembly of the wind turbine blade at the connection joint.

The spar cap portions have a thickness at the connection joint, and the electromagnetic shield may terminate away from the connection joint at a spanwise distance from the connection joint, the spanwise distance being 40 times or less the thickness of the spar caps at the connection joint, preferably 30 times or less, preferably 20 times or less, or preferably 10 times or less. In this way, the electromagnetic shield is local to the connection joint and it does not have to extend the full length of the spar cap, thus saving on blade materials and manufacturing time.

The connection joint may comprise a mechanical jointed connection. Such a joint may be a bolted connection. The use of the electromagnetic shield protects the mechanical joint, which may include metallic components, from overheating in the event of a lightning strike. Excessive heating of the mechanical joint may result in damage and shorten the fatigue lifetime of the components.

The connection joint may comprise an adhesively bonded joint, preferably a scarf joint. The scarf joint may be a single scarf joint or a double scarf joint. Scarf joints are preferred because they allow load to be transferred from the spar cap portions over a relatively large surface area. However, they also have relatively large bonding areas and the electromagnetic shield protects the adhesive bonds from overheating, which may occur if a large amount of lightning current passes directly through the bond lines. The electromagnetic shield prevents any voltage flashovers occurring across the bond lines.

The wind turbine blade may further comprise a down conductor to transfer lightning current from the tip of the blade to the root of the blade.

The down conductor may include a lightning protection layer in the form of a conductive sheet adjacent an outer surface of the blade, the lightning protection layer being separated from the first spar cap portion and the second spar cap portion by insulating material. Preferably the conductive sheet is in the form of a metal foil such as a metal mesh or an expanded metal foil.

The down conductor may be equipotentially bonded to the electromagnetic shield. By equipotentially connecting the down conductor and the electromagnetic shield ensures that there will be no voltage flashovers between the electromagnetic shield and the down conductor which could damage the blade.

The electromagnetic shield may comprise a metallic foil. The metallic foil may be in the form of a metal mesh or an expanded metal foil. The metal foil may have a thickness of less than 1 mm, optionally between 0.2 mm and 0.6 mm, and optionally between 0.25 mm and 0.5 mm or between 0.2 mm and 0.3 mm. The metallic foil of the electromagnetic shield may be the same material as the lightning protection layer in the form of a conductive sheet adjacent an outer surface of the blade. Suitable materials for the metallic foil may include aluminium, copper and stainless steel. If the conductive fibres are carbon, the metal may be tinned to prevent galvanic corrosion with the carbon. A metallic foil provides high conductivity so that it is a preferred current path for the lightning current.

The electromagnetic shield may comprise metallic wires incorporated into a glass fibre layer. This material may be easily handled so as to facilitate the manufacture and the assembly of the blade. The wires may be laid in a wavy pattern such that they do not suffer from fatigue damage during the use of the wind turbine blade.

BRIEF DESCRIPTION OF THE DRAWINGS

The present invention will now be described by way of non-limiting examples only, with reference to the accompanying figures, in which.

DETAILED DESCRIPTION

Figure 1:
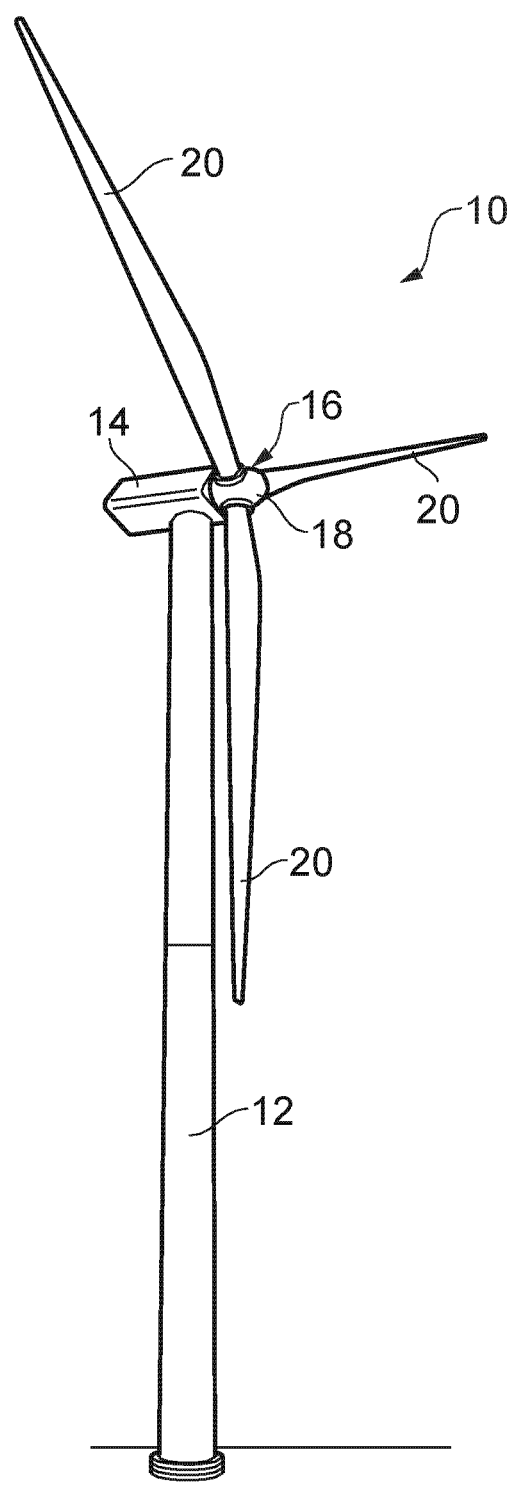
FIG. 1 shows a wind turbine.

In this specification, terms such as leading edge, trailing edge, pressure surface, suction surface, thickness, chord and planform are used. While these terms are well known and understood to a person skilled in the art, definitions are given below for the avoidance of doubt.

The term leading edge is used to refer to an edge of the blade which will be at the front of the blade as the blade rotates in the normal rotation direction of the wind turbine rotor.

The term trailing edge is used to refer to an edge of a wind turbine blade which will be at the back of the blade as the blade rotates in the normal rotation direction of the wind turbine rotor.

The chord of a blade is the straight line distance from the leading edge to the trailing edge in a given cross section perpendicular to the blade spanwise direction. The term chordwise is used to refer to a direction from the leading edge to the trailing edge, or vice versa.

A pressure surface (or windward surface) of a wind turbine blade is a surface between the leading edge and the trailing edge, which, when the blade is in use, has a higher pressure than a suction surface of the blade.

A suction surface (or leeward surface) of a wind turbine blade is a surface between the leading edge and the trailing edge, which will have a lower pressure acting upon it than that of a pressure surface, when the blade is in use.

The thickness of a wind turbine blade is measured perpendicularly to the chord of the blade and is the greatest distance between the pressure surface and the suction surface in a given cross section perpendicular to the blade spanwise direction.

The term spanwise is used to refer to a direction from a root end of a wind turbine blade to a tip end of the blade, or vice versa. When a wind turbine blade is mounted on a wind turbine hub, the spanwise and radial directions will be substantially the same.

A view which is perpendicular to both of the spanwise and chordwise directions is known as a planform view. This view looks along the thickness dimension of the blade.

The term spar cap is used to refer to a longitudinal, generally spanwise extending, reinforcing member of the blade. The spar cap may be embedded in the blade shell, or may be attached to the blade shell. The spar caps of the windward and leeward sides of the blade may be joined by one or more shear webs extending through the interior hollow space of the blade. The blade may have more than one spar cap on each of the windward and leeward sides of the blade. The spar cap may form part of a longitudinal reinforcing spar or support member of the blade. In particular, spar caps may form part of the load bearing structure extending in the longitudinal direction that carries the flapwise bending loads of the blade.

The term shear web is used to refer to a longitudinal, generally spanwise extending, reinforcing member of the blade that can transfer load from one of the windward and leeward sides of the blade to the other of the windward and leeward sides of the blade.

FIG. 1 shows a wind turbine 10 including a tower 12 mounted on a foundation and a nacelle 14 disposed at the apex of the tower 12. A rotor 16 is operatively coupled to a generator (not shown) housed inside the nacelle 14. The rotor 16 includes a central hub 18 and a plurality of rotor blades 20, which project outwardly from the central hub 18. It will be noted that the wind turbine 10 is the common type of horizontal axis wind turbine (HAWT) such that the rotor 16 is mounted at the nacelle 12 to rotate about a substantially horizontal axis defined at the centre at the hub 18. While the example shown in FIG. 1 has three blades, it will be realised by the skilled person that other numbers of blades are possible.

When wind blows against the wind turbine 10, the blades 20 generate a lift force which causes the rotor 16 to rotate, which in turn causes the generator within the nacelle 14 to generate electrical energy.

Figure 2:
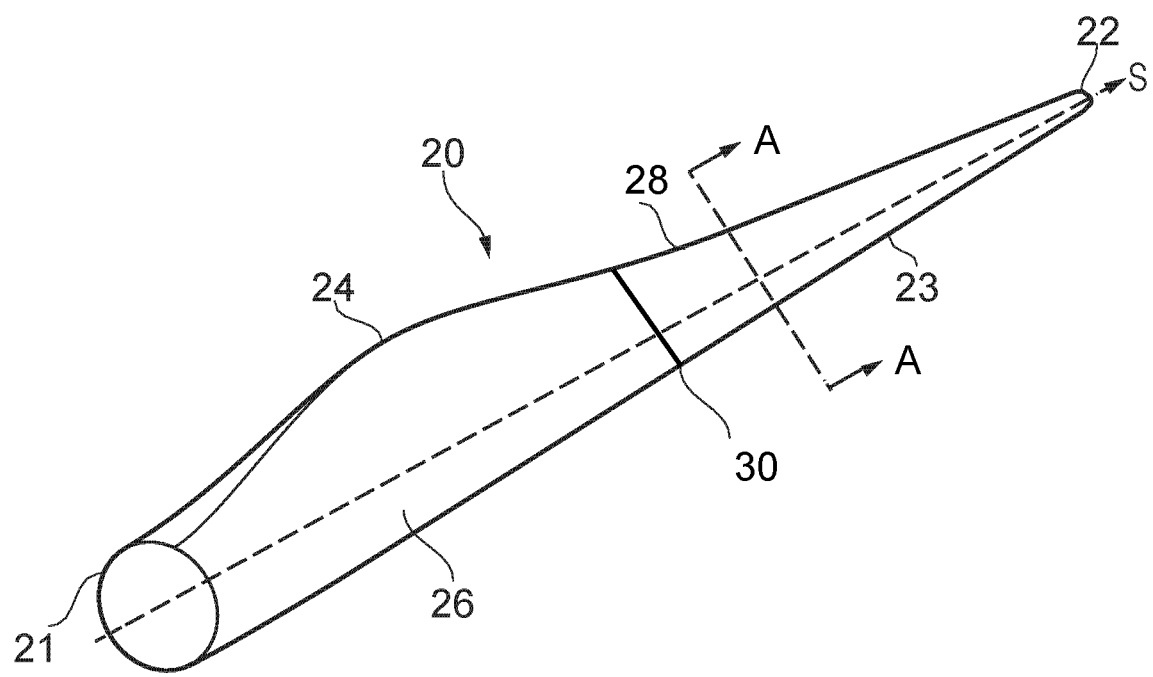
FIG. 2 shows a wind turbine blade.

FIG. 2 illustrates one of the wind turbine blades 20 for use in such a wind turbine. Each of the blades 20 has a root end 21 proximal to the hub 18 and a tip end 22 distal from the hub 18. The blade 20 is arranged to extend away from the hub 18 in a spanwise direction S. A leading edge 23 and a trailing edge 24 extend between the root end 21 and tip end 22, and each of the blades 20 has a respective aerodynamic high pressure surface (i.e. the pressure surface) and an aerodynamic low pressure surface (i.e. the suction surface) extending between the leading and trailing edges of the blade.

Each blade has a cross section which is substantially circular near the root end 21, because the blade near the root must have sufficient structural strength to support the blade outboard of that section and to transfer loads into the hub 18. The blade 20 transitions from a circular profile to an aerofoil profile moving from the root end 21 of the blade towards the tip end 22. The blade may have a "shoulder", which is the widest part of the blade where the blade has its maximum chord. The blade 20 has an aerofoil profile of progressively decreasing thickness towards the tip end 22.

The blade 20 is a modular blade comprising a first blade module 26 and a second blade module 28. The first blade module and the second blade module are connected together at a connection joint 30. The connection joint may be a mechanical joint or an adhesively bonded joint. The connection joint 30 may extend in a substantially chordwise direction. Details of the connection joint will be explained further below.

Figure 3:
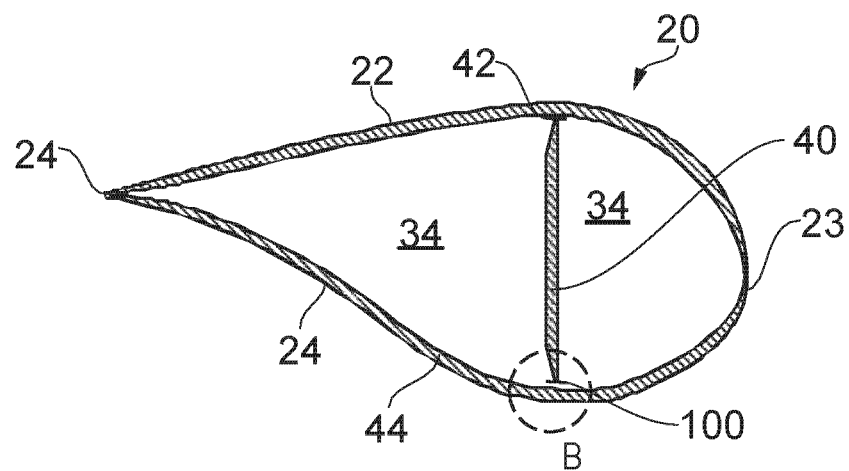
FIG. 3 shows a cross section of the wind turbine blade.

As shown in FIG. 3, which is a cross sectional view of the blade 20 taken along the line A-A, the wind turbine blade 20 may include an outer blade shell formed of an upper part 42 and a lower part 44, which together define a hollow interior space 34 with a shear web 40 extending internally between the upper and lower parts of the blade shell 42, 44. The blade shell parts may be two half-shells 42, 44 which are separately moulded before being joined together (at the leading edge 23 and the trailing edge 24) to form the blade 20. It will be appreciated that the blade shell 42, 44 need not be formed as two half-shells which are subsequently joined together but may be formed as a unitary shell structure, together with the shear web 40, in a "one shot" single shell process. The blade shell may include a laminate composite material such as glass fibre and/or carbon fibre for example.

The cross section in FIG. 3 is taken along the line A-A in the second blade module. The cross section of the blade and the interior features are substantially the same in the first blade module.

Figure 4:
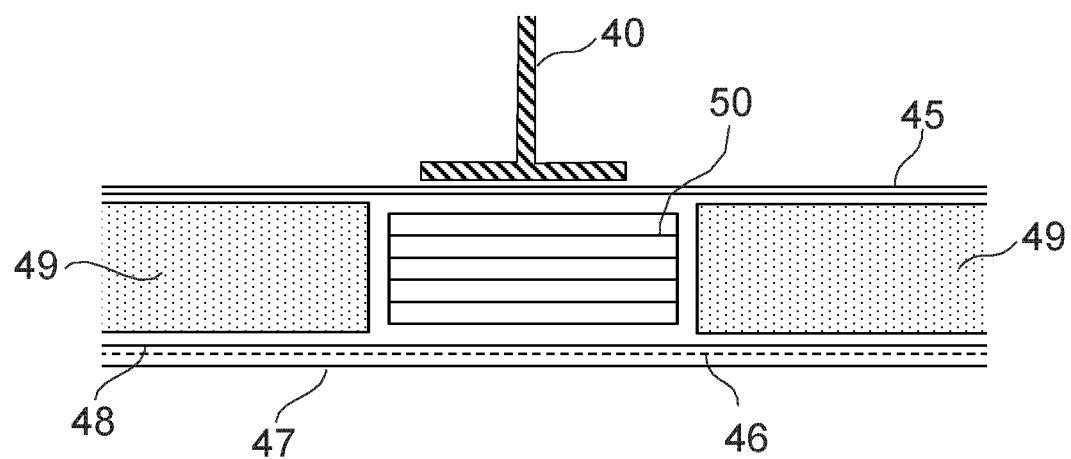
FIG. 4 shows an enlarged cross section of the wind turbine blade.

FIG. 4 shows a detail view of the region B, where the shear web 40 meets the blade shell 44. A spar cap 50 is incorporated into the outer shell 44, as shown in FIG. 4, or may be attached to the outer shell 44. The spar cap 50 is an elongate reinforcing structure and may extend substantially along the full spanwise length of the blade 20 from the root end 21 to the tip end 22. The spar cap 50 includes conductive material, such as carbon fibres. For example, the spar cap may include pultruded fibrous strips of material such as pultruded carbon fibre composite material or other carbon fibre reinforced plastic material.

The spar cap 50 may include a stack of layers of the conductive material. The shear web 40 may be adhesively bonded to an inner surface of the spar cap 50. An outer surface of the spar cap 50 may sit adjacent a lightning conductor 46 in the outer surface of the blade shell 44. As shown in FIG. 4, the lightning conductor may be in the form a lightning protection layer 46 which may be separated from the outer surface of the spar cap 50 by one or more layers of insulating material 48, such as glass fibre reinforced plastic. One or more further layers of glass fibre reinforced plastic 47 may be provided over the outside of the lightning protection layer 46. The lightning protection layer 46 may be in the form of a conductive sheet, such as a metallic foil. The layers collectively form an outer skin of the blade shell 44. One or more further layers 45 of glass fibre reinforced plastic provide an inner skin of the blade shell 44 with a core material 49 between the outer skin 48 and the inner skin 45. The core material may be a light structural foam, though other core materials such as wood, particularly balsa wood may alternatively be used to provide a lightweight core material. It will be appreciated that a near identical connection may be made between the shear web 40 and the other side of the blade shell 42.

The blade materials for the first and second blade modules are laid up in moulds, where they are then infused with resin to bond the blade materials together. As is well known in the art, the blade materials are covered with a sealed vacuum bag which is evacuated, and then resin is infused into the blade materials. The resin is then cured which may be at an elevated temperature. This is known as a vacuum assisted resin transfer moulding (VARTM) process.

Figure 5:
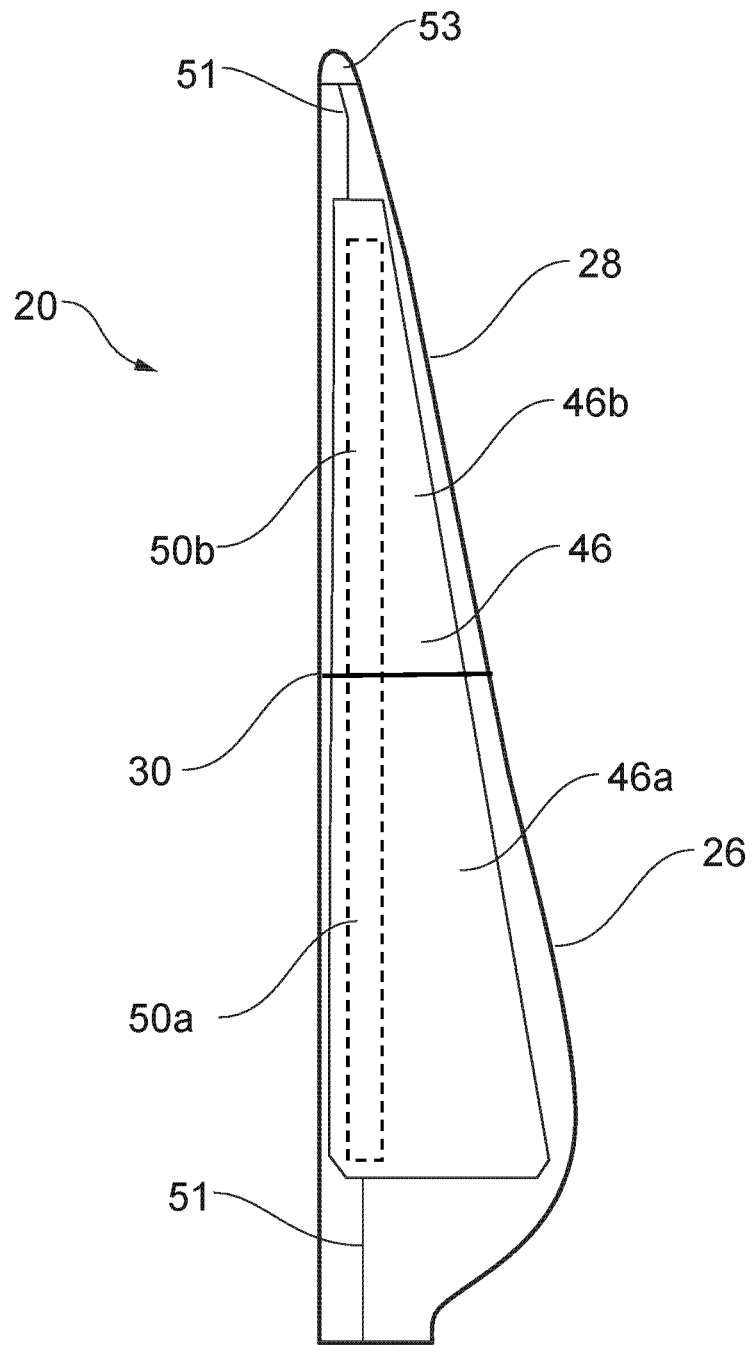
FIG. 5 shows a plan view of the wind turbine blade.

FIG. 5 schematically shows a plan view of the blade 20. The blade 20 includes one or more lightning receptors and one or more lightning down conductors which form part of a lightning protection system for the wind turbine. The lightning receptors attract the lightning strike and the down conductors conduct the energy of the lightning strike down the blade 20 via the nacelle 14 and tower 12 to ground. The lightning down conductor may take a variety of forms, such as the lightning protection layer 46 on the outer surface of the blade and/or a cable 51, e.g. running through the interior of the hollow blade. The lightning receptors may include the lightning protection layer 46, and/or a solid metal tip 53.

The majority of the outer surface of the blade 20 may be covered with the lightning protection layer 46. The lightning protection layer 46 serves to shield conductive material in the blade from a lightning strike, and it may act as either a lightning receptor, a down conductor, or both. The lightning protection layer 46 may extend substantially the full length of the blade. Where the majority of the outer surface of the blade 20 is covered with the lightning protection layer 46, the cable 51 may connect to the lightning protection layer 46 adjacent the tip end of the blade and adjacent the root end of the blade, with no cable 51 along the majority of the length of the blade covered with the lightning protection layer 46. The lightning protection layer 46 may extend from root to tip in which case there may be no need for cable 51.

FIG. 5 shows the connection joint 30 which separates the first blade module 26 and the second blade module 28. The connection joint 30 extends in a substantially chordwise direction to divide the blade into two spanwise modules. The lightning protection layer 46 may be divided into a first portion 46a associated with the first blade module 26 and a second portion 46b associated with the second blade module 28.

Also shown in FIG. 5 is the spar cap 50 which extends in the spanwise direction of the blade. It will be appreciated, that the blade will have another spar cap on the opposing side of the blade. Furthermore additional spar caps may be provided where needed to provide the required strength to the blade. The spar cap 50 comprises a first spar cap portion 50a associated with the first blade module 26 and a second spar cap portion 50b associated with the second blade module 28. The first spar cap portion 50a and the second spar cap portion 50b are connected together end to end at the connection joint 30.

Figure 6:
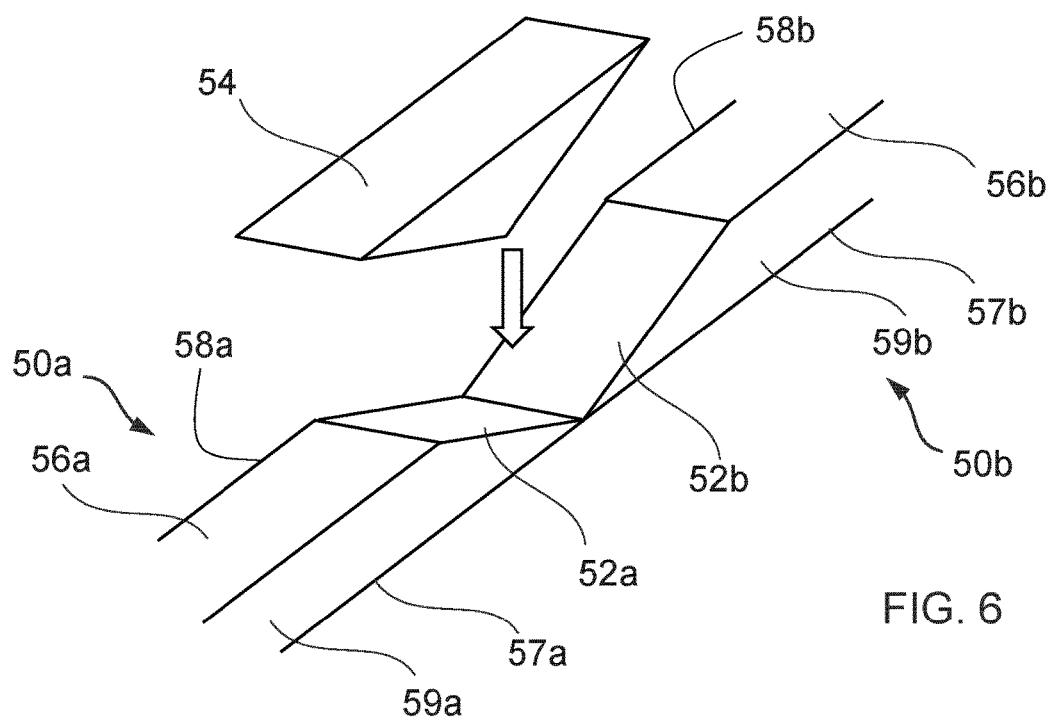
FIG. 6 shows a perspective view of a connection joint between two spar cap portions.
Figure 7:
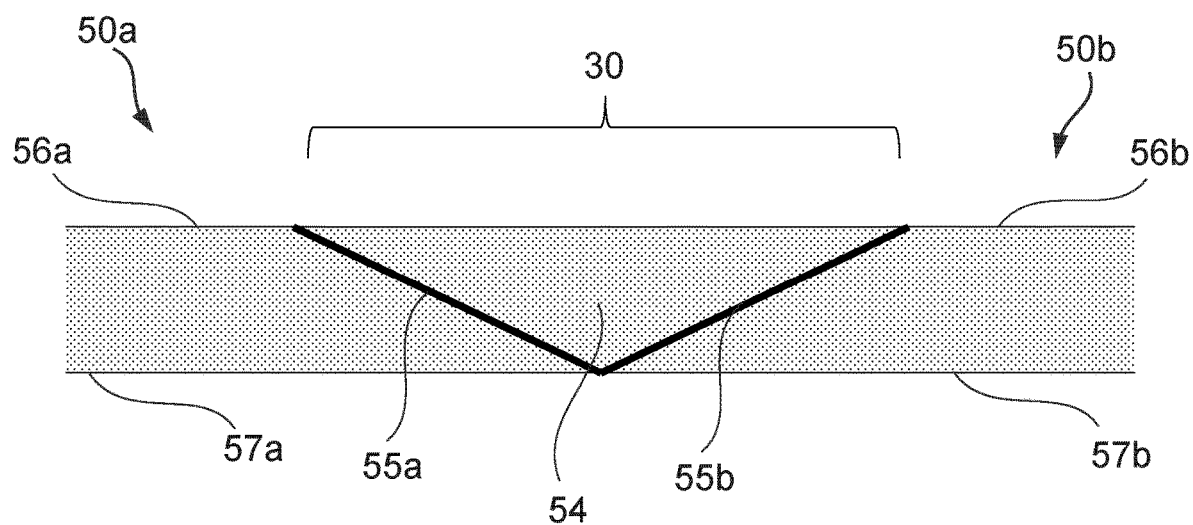
FIG. 7 shows a cross sectional view of a connection joint between two spar cap portions.

FIGS. 6 and 7 show schematically how the first spar cap portion 50a and the second spar cap portion 50b may be connected together. These figures show a simplified representation of the spar caps and other blade features are not shown for clarity. The connection joint shown in FIGS. 6 and 7 is an adhesively bonded joint, in particular, a double scarf joint. However, the invention is not limited to this type of connection joint and other connection joints are possible as will be explained below.

The connection joint 30 in FIGS. 6 and 7 is a double scarf joint. As can be seen, the connection joint 30 extends over a spanwise region of the blade and it does not need to occur at a single spanwise location. The first spar cap portion 50a and the second spar cap portion 50b each terminate at a tapered end surface 52a and 52b respectively. A connection element 54 having complementary scarfed surfaces connects the first spar cap portion 50a and the second spar cap portion 50b together at adhesive bond lines 55a and 55b. The adhesive may be a paste adhesive such as epoxy, or it may be a resin for example which is infused into to the connection joint.

The connection element may be formed from the same material as the first and second spar cap portions. For example, the connection element may include pultruded fibrous strips of material such as pultruded carbon fibre composite material or other carbon fibre reinforced plastic material.

Each of the first and second spar cap portions 50a, 50b have an outer surface 56a, 56b facing towards an exterior of the blade, an inner surface 57a, 57b facing towards an interior of the blade, a first side surface 58a, 58b facing towards the leading edge of the blade and a second side surface 59a, 59b facing towards the trailing edge of the blade. The connection element shown in FIGS. 6 and 7 is received in a tapered recess in the outer surfaces of the spar cap portions, but it could also be received in a tapered recess in the inner surfaces of the spar cap portions in another configuration.

Collectively, the outer surfaces 56a, 56b of both of the spar cap portions 50a, 50b may be designated as 56. Similarly, the inner surfaces as 57, and the side surfaces as 58 and 59.

In the event of a lightning strike at the tip of the blade lightning current will flow via the down conductors from the tip of the blade to the root of the blade. As the spar caps are formed of conductive material, lightning current may also be present in the spar caps. Without any mitigation features, the lightning current may flow directly through the connection joint 30.

Figure 8:
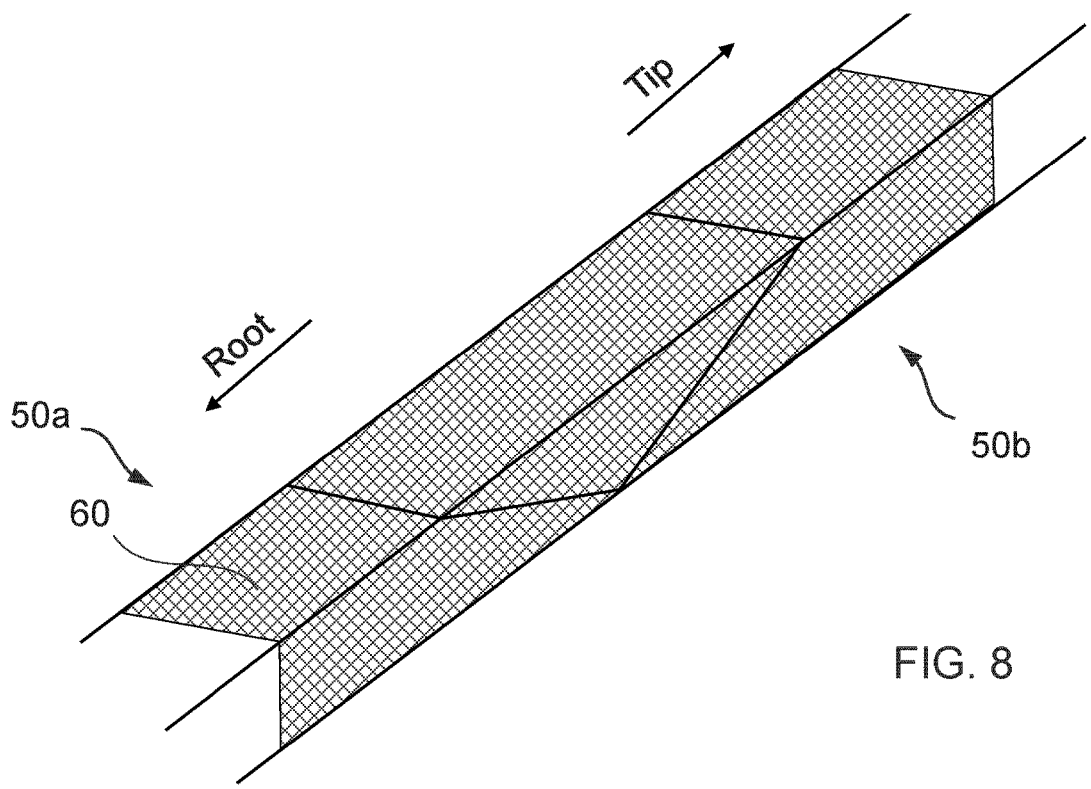
FIG. 8 shows an electromagnetic shield around the connection joint in a perspective view.
Figure 9:
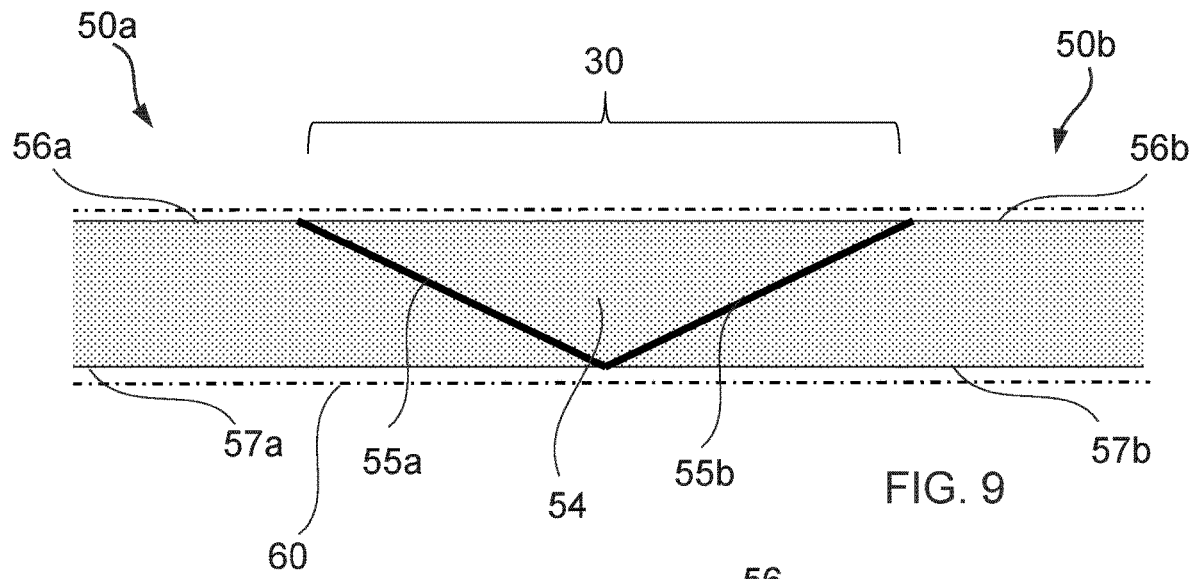
FIG. 9 shows an electromagnetic shield around the connection joint in a spanwise cross sectional view.
Figure 10:
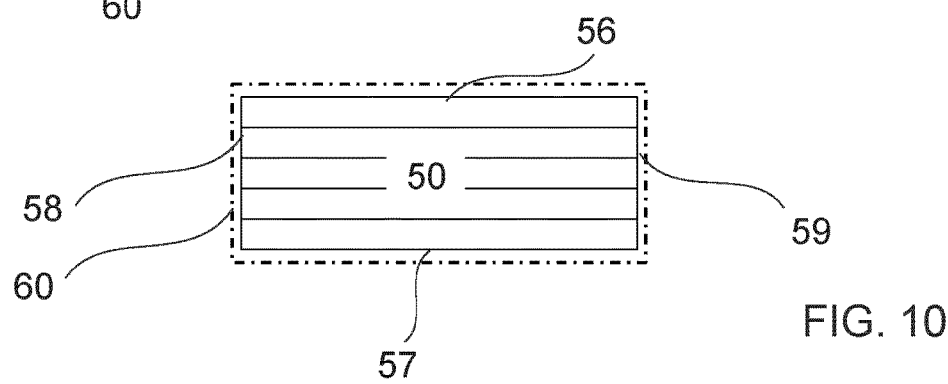
FIG. 10 shows an electromagnetic shield around the connection joint in a chordwise cross sectional view.

FIGS. 8, 9 and 10 show how the connection joint 30 has been protected so that the amount of lightning current that can flow directly through the connection joint is reduced. FIG. 8 is a schematic perspective view of the first spar portion and the second spar cap portion arranged end to end at the connection joint. FIG. 9 is a spanwise cross section through the spar cap looking towards the leading edge or the trailing edge. FIG. 10 is a chordwise cross section through either of the first spar cap portion, the second spar cap portion or even the connection element looking towards the root of the blade or the tip of the blade.

An electromagnetic shield 60 covers the connection joint 30. As shown, the electromagnetic shield surrounds all surfaces of the first spar cap portion 50a and the second spar cap portion 50b. However, as will be explained below, the electromagnetic shield 60 may only cover one or more surfaces. In an example, the electromagnetic shield 60 is an electrically conductive metallic foil.

The electromagnetic shield 60 is positioned on and is in electrically conductive contact with the first spar cap portion 50a and the second spar cap portion 50b at the connection joint 30. The electromagnetic shield 60 may also be in electrically conductive contact with the connection element 54. The electromagnetic shield is in direct and intimate contact with spar cap portions such that the electromagnetic shield is conductive contact with the spar cap portions. In other words, there is no insulating material between the electromagnetic shield and the spar cap portions.

In the event of lightning striking the tip of the wind turbine blade, lightning current is transferred from near the tip of the blade to the root of the blade. The lightning current will flow through the blade's lightning protection system (e.g. the lightning protection layer 46) but there may also be a proportion of lighting current in the spar cap 50. The spar cap 50 is formed from electrically conductive fibres (e.g. carbon fibres) and so it will conduct the lightning current.

Considering FIG. 8, as lightning current flows through the spar cap 50 from the tip (at the top right of FIG. 8) to the root (at the bottom left of FIG. 8) the lightning current has two parallel paths across the connection joint 30. The first current path is through the adhesive bond line 55b, then the connection element 54 and then the other adhesive bond line 55a. The second current path is though the electromagnetic shield 60 since this is in direct contact with the spar cap 50.

The second current path though the electromagnetic shield 60 is configured to be the preferred current path so that the majority of current takes this path, rather than the first current path through the adhesive bond lines. This is because (i) the electromagnetic shield 60 has a lower impedance than the spar cap 50; and (ii) as the electromagnetic shield 60 is positioned on the outer surface of the spar cap 50, the skin effect means that the current flows preferentially using the outermost volume of the conductor system, and therefore the current will be greater at the electromagnetic shield 60 than in the interior of the spar cap 50.

In effect, as the current flows from the tip to root direction, the current is diverted into the electromagnetic shield 60. This is advantageous as it avoids high current passing though the adhesive bonds which may otherwise damage the bond lines. Avoiding high currents at the bond lines means that there will be reduced heating of the adhesive bonds as lightning current passes through. Even if conductive adhesive is used at the bond lines, it is still desirable to reduce current flow through the bond lines which is achieved by the electromagnetic shield.

Figure 11:
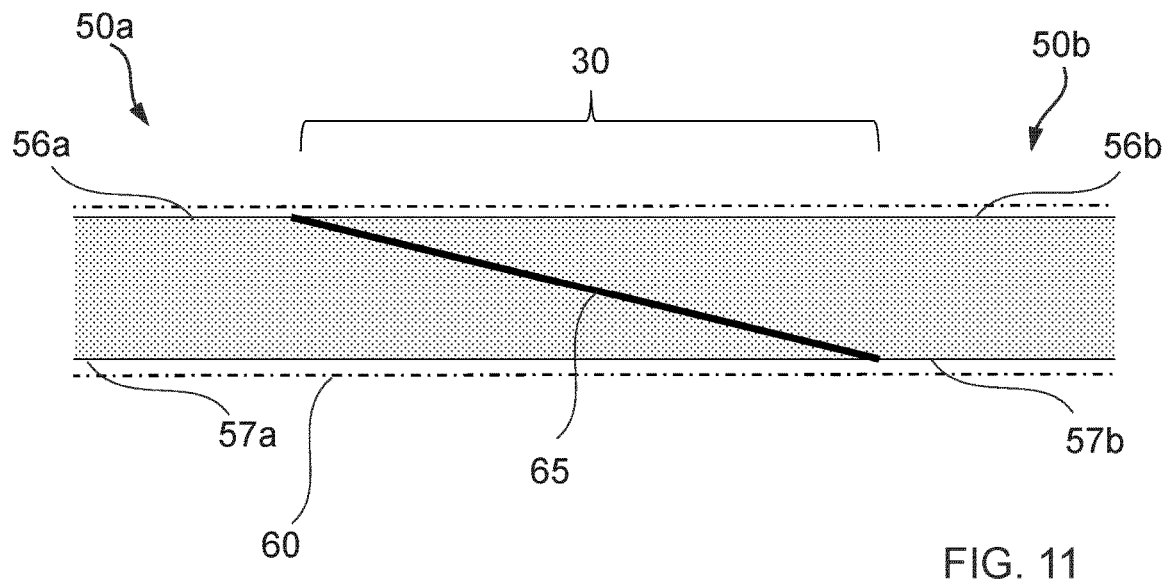
FIG. 11 shows a cross sectional view of a bonded connection joint between two spar cap portions.

FIG. 11 shows another example of an adhesively bonded connection joint. FIG. 11 is a spanwise cross section through the spar cap looking towards the leading edge or the trailing edge. In this case the connection joint is formed as a single scarf joint with an adhesive bond line 65. With a single scarf joint there is no need for the separate connection element 54. The electromagnetic shield 60 may be positioned on the first spar portion 50a and the second spar cap portion 50b in the same manner as described above with reference to FIGS. 8 to 10.

Figure 12:
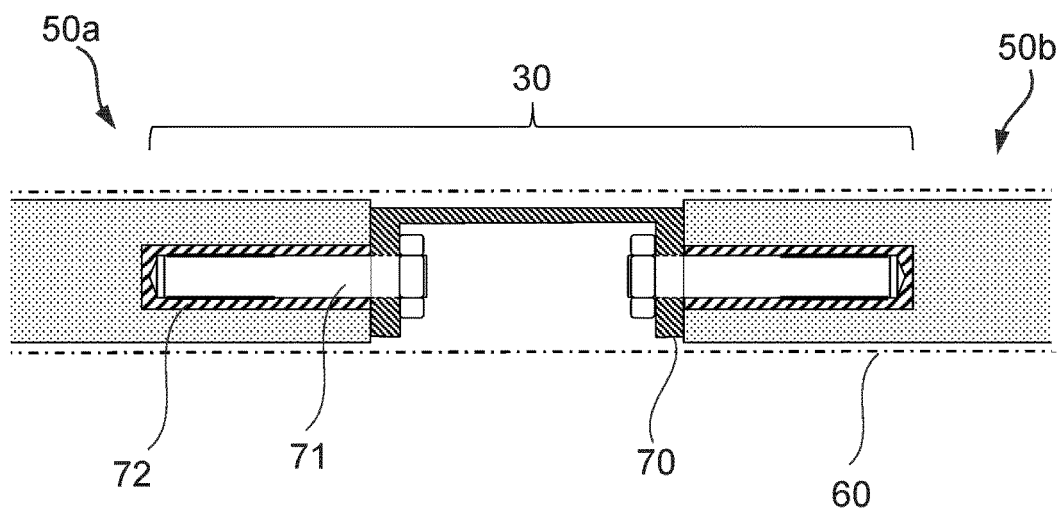
FIG. 12 shows a cross sectional view of a mechanical connection joint between two spar cap portions.

FIG. 12 shows an example of the electromagnetic shield 60 being used on a mechanically bolted joint. FIG. 10 is a spanwise cross section through the spar cap looking towards the leading edge or the trailing edge. The connection joint comprises a U-shaped bracket 70 that is positioned between respective ends the first spar cap portion 50a and the second spar cap portion 50b. The U-shaped bracket 70 is connected to each of the first and second spar caps by bolts 71 which are screwed into metallic bushings 72. The metallic bushings are embedded in the first and second spar caps, and are bonded with adhesive to the laminate of the spar caps.

As shown, the electromagnetic shield 60 is positioned on and in electrically conductive contact with the first and second spar cap portions. Therefore, as described for the adhesive joint discussed above, in the event of a lightning strike, the majority of the lightning current will flow through the electromagnetic shield rather than through the bushings/bolts and U-shaped bracket. This prevents excessive heating of the metallic components of the connection joint and the heating of the adhesive that bonds the bushings 72 to the first and second spar cap portions 50a, 50b.

It should be noted that the example of the bolted joint given in FIG. 11 is just one specific example of a bolted joint. The electromagnetic shield 60 may be applied to any type of bolted joint that is used to connect two modules of a wind turbine blade to each other.

Figure 13:
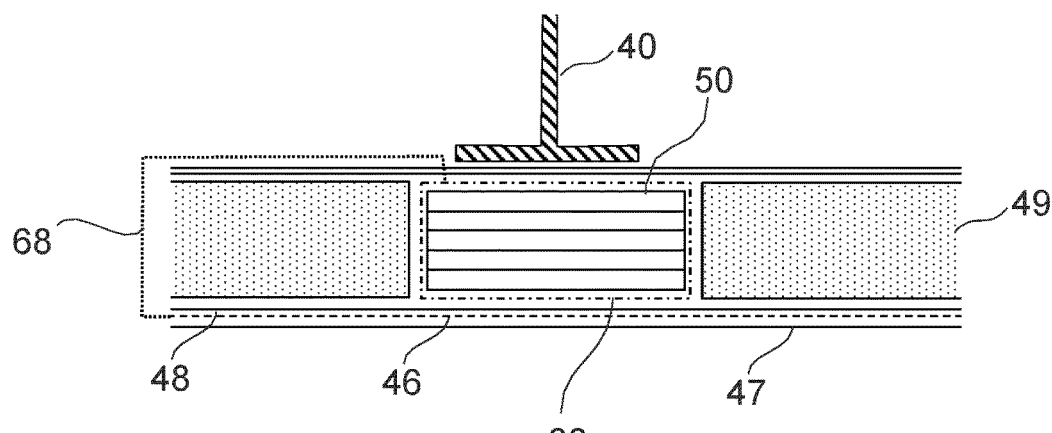
FIG. 13 shows a chordwise cross sectional view of the electromagnetic shield and a down conductor.

As shown in the cross sectional view in FIG. 13, the electromagnetic shield 60 may also be electrically connected to the lightning protection system. In this example, the electromagnetic shield 60 is connected via a conductor 68 to the lightning protection layer 46. In this way the electromagnetic shield 60 (and hence the spar cap) is equipotentially bonded to the lightning down conductor preventing any flashovers which may cause damage to the blade.

FIGS. 8 and 9 show how the electromagnetic shield 60 can be a single piece component extending across the connection joint 30. However, as shown in the example of FIGS. 14a, 14b and 14c, the electromagnetic shield 60 may be formed from a plurality of discrete portions.

Figure 14A:
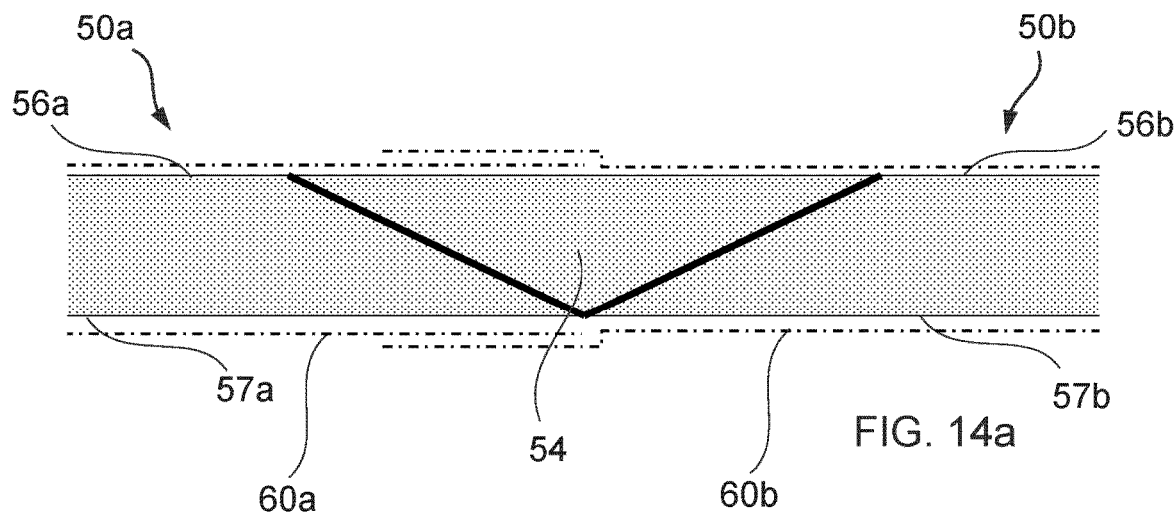
FIGS. 14a, 14b and 14c show configurations of the electromagnetic shield.

In FIG. 14a the electromagnetic shield 60 comprises a first shield portion 60a positioned on the first spar cap portion 50a and a second shield portion 60b positioned on the second spar cap portion 50b. The first and second shield portions overlap at the joint so that there is electrical conduction between the two shield portions. Providing a separate shield portion associated with each spar cap portion facilitates the assembly of the two spar cap portions at the blade joint.

Figure 14B:
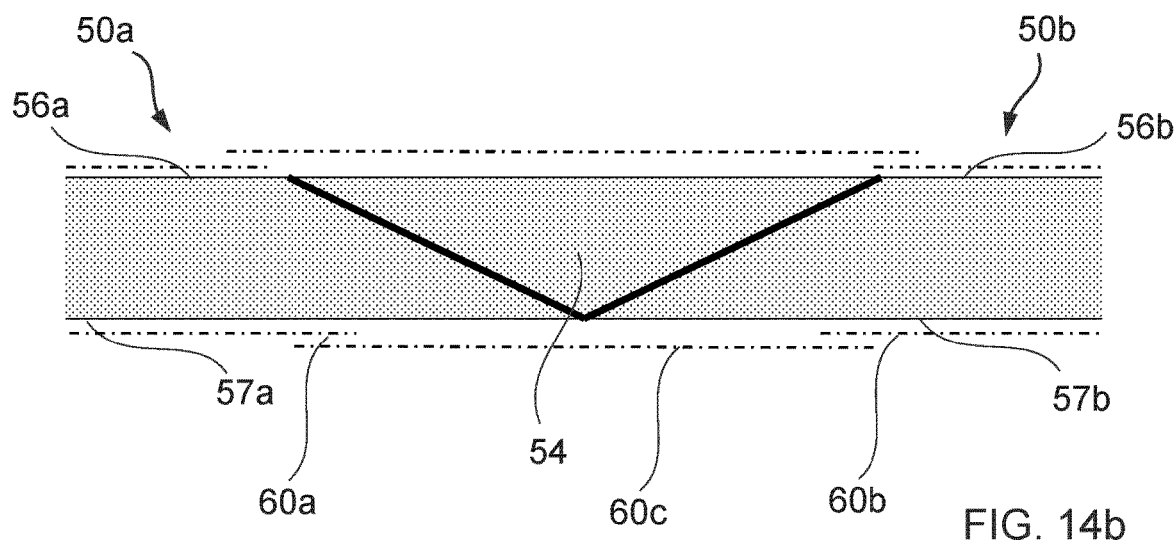

In FIG. 14b the electromagnetic shield 60 comprises a first shield portion 60a positioned on the first spar cap portion 50a and a second shield portion 60b positioned on the second spar cap portion 50b. A third shield portion 60c is positioned between the first and second shield portions 60a, 60b. The first shield portion 60a and the second shield portion 60b are electrically connected via the third shield portion 60c at the connection joint. As shown, the third shield portion 60c overlaps with the first and second shield portions 60a, 60b to create the electrical connection. Providing three shield portions in this way may further facilitate the assembly of the two spar cap portions at the blade joint. In particular, the first and second shield portions 60a, 60b may be attached to their respective spar cap portions in a factory, and the third shield portion 60c may be added when the connection joint is assembled at the wind turbine site.

Figure 14C:
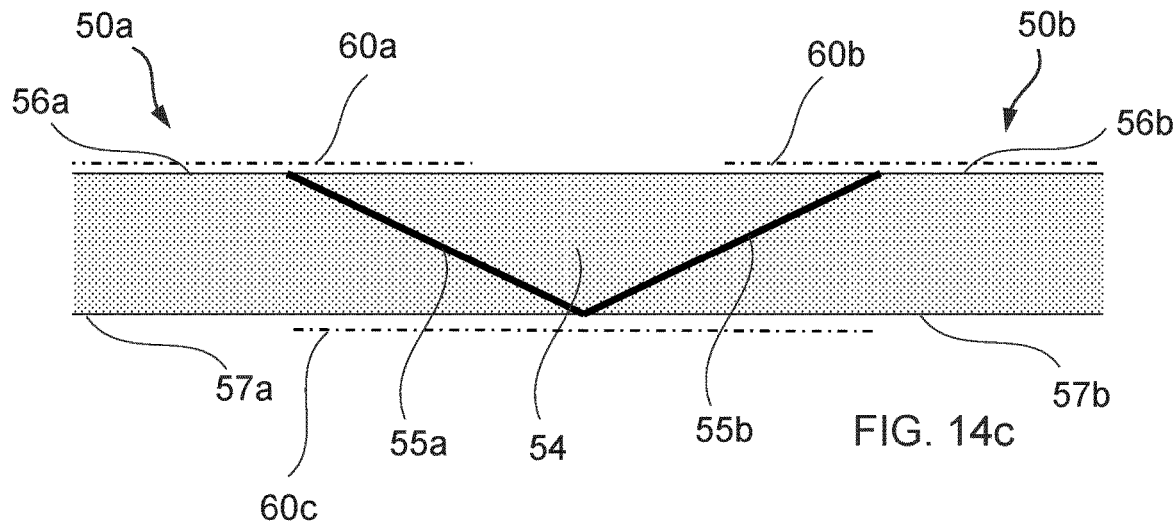

As shown in FIG. 14c, a first shield portion 60a and a second shield portion 60b are both positioned on the outer surfaces 56a, 56b of the first and second spar caps respectively and are separated from each other. A third shield portion 60c is positioned across the connection joint on the inner surface 57 of the spar cap, such that the third shield portion 60c is separated from the first and second shield portions 60a, 60b by a thickness of the spar cap. When viewed in a thickness direction through the spar, the third shield portion 60c overlaps, in projection, with the first shield portion 60a and the second shield portion 60b. In this example, the adhesive bond lines 55a and 55b are partially shielded by the electromagnetic shield 60. The first and second shield portions 60a, 60b may be positioned on both the first and second spar cap portions 50a, 50b respectively and the connection element 54. In this way, in the event of lightning current in the spar cap 50, the preferred path for the lightning current is via the electromagnetic shield 60 rather than the adhesive bond lines. On the outer surface 56 of the spar cap, where there is a break between the first and second shield portions 60a, 60b, the lightning current may travel through the connection element. However, in this portion there are no adhesive bonds and so the adhesive bonds are still protected from the lightning current.

In the example of FIG. 14c, the majority of the connection joint is protected against lightning current, in particular the ends of the bond lines where voltage flashovers are more likely to occur. The use of the electromagnetic shield configuration in FIG. 14c minimises the amount of foreign material (i.e. the electromagnetic shield) in contact with the spar cap and it uses less electromagnetic shield material compared with the examples of FIGS. 14a and 14b, for example.

Figure 15:
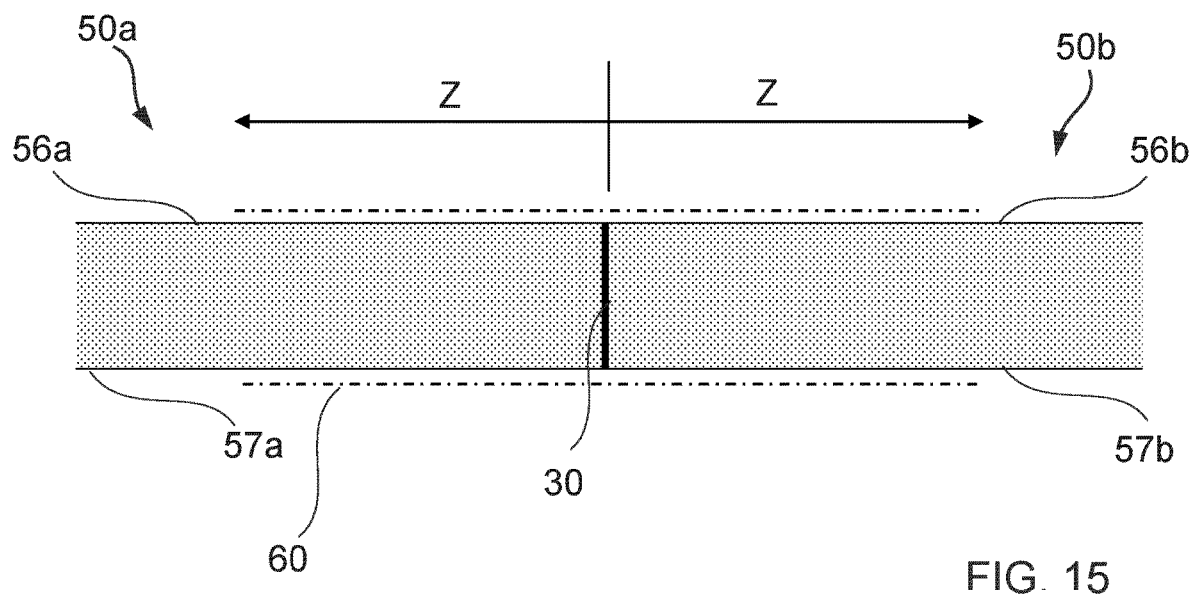
FIG. 15 shows the spanwise extent of the electromagnetic shield.

While the electromagnetic shield 60 could extend the whole spanwise length of the spar cap 50, it actually only needs to be locally provided at the connection joint 30. Referring to FIG. 15, the spar cap has a thickness T which is the distance between the outer surface 56 and the inner surface 57. The electromagnetic shield 60 extends for a spanwise length Z either side of the connection joint 30 and terminates, on each side of the connection joint, at a spanwise distance from the connection joint. The spanwise distance at which the electromagnetic shield 60 terminates on each side of the connection joint may be 40 times or less the thickness of the spar cap at the connection joint, preferably 30 times or less, preferably 20 times or less, or preferably 10 times or less.

In an example, if the spar cap 50 at the connection joint 30 is 50 mm thick, the electromagnetic shield may terminate within 2 m either side of the connection joint.

The electromagnetic shield 60 does not have to terminate at the same spanwise distance either side of the connection joint, it may be shorter on one side than the other.

Where the connection joint 30 comprises a scarf joint (e.g. as shown in FIG. 9 or FIG. 11), the spanwise length Z either side of the connection joint may be measured from the distal ends of the adhesive bonds.

In the example of FIG. 10, the electromagnetic shield 60 is shown as covering all surfaces of the spar cap 50, namely the outer surface 56, the inner surface 57 and the first and second side surfaces 58, 59. However, the electromagnetic shield 60 may only cover a single surface of the spar cap. Preferably the electromagnetic shield 60 will cover all the surfaces of the spar cap as this will provide a greater level of protection to the joint, but a sufficient level of protection may be provided if three, two or just one surface is covered.

In a preferred example, only the outer surface 56 and the inner surface 57 of the spar cap 50 are covered with the electromagnetic shield. In this configuration, the electromatic shield parts on the outer surface and the inner surface operate at different frequency ranges of the lightning pulse to provide sufficient shielding to the joint.

The invention claimed is:

1. A wind turbine blade extending longitudinally in a spanwise direction between a root end and a tip end, and extending in a chordwise direction between a leading edge and a trailing edge, the wind turbine blade comprising:
    a first blade module having a first spar cap portion extending in the spanwise direction of the wind turbine blade, the first spar cap portion comprising electrically conductive fibres;
    a second blade module having a second spar cap portion extending in the spanwise direction of the wind turbine blade, the second spar cap portion comprising electrically conductive fibres;
    the first spar cap portion and the second spar cap portion each having an outer surface facing towards an exterior of the blade, an inner surface facing towards an interior of the blade, a first side surface facing towards the leading edge of the blade, and a second side surface facing towards the trailing edge of the blade;
    the first blade module and the second blade module being configured for connection end-to-end via their respective spar cap portions at a connection joint;
    wherein an electromagnetic shield is positioned on and in electrically conductive contact with at least one surface of the first spar cap portion and at least one surface of the second spar cap portion, the electromagnetic shield extending across the connection joint in the spanwise direction.

2. The wind turbine blade according to claim 1, wherein the electromagnetic shield is positioned on an upper surface and/or the inner surface of each of the first and second spar cap portions.

3. The wind turbine blade according to claim 1, wherein the electromagnetic shield is positioned on the first side surface and/or the second side surface of each of the first and second spar cap portions.

4. The wind turbine blade according to any one of the preceding claim 1, wherein the electromagnetic shield comprises a layer that extends unbroken across the connection joint.

5. The wind turbine blade according to claim 1, wherein the electromagnetic shield comprises a first shield portion positioned on the first spar cap portion and a second shield portion positioned on the second spar cap portion.

6. The wind turbine blade according to claim 5, wherein the first shield portion and the second shield portion are in contact with each other at the connection joint.

7. The wind turbine blade according to claim 5, wherein the first shield portion and the second shield portion overlap at the connection joint.

8. The wind turbine blade according to claim 5, wherein:
    the first shield portion and the second shield portion are both positioned on the outer surface or the inner surface of the first and second spar cap portions respectively, and the first and second shield portions are separated from each other in the spanwise direction;
    a third shield portion is positioned across the connection joint on the other of the outer surface or the inner surface such that the third shield portion is separated from the first and second shield portions by a thickness of the first and second spar cap portions;
    the third shield portion overlaps, in projection, with the first shield portion and the second shield portion in the spanwise direction of the wind turbine blade.

9. The wind turbine blade according to claim 5, further comprising a third shield portion wherein the first shield portion and the second shield portion are electrically connected via a third shield portion at the connection joint, the third shield portion being in electrical contact with both the first and second shield portions.

10. The wind turbine blade according to claim 1, wherein the first and second spar cap portions have a thickness at the connection joint, and the electromagnetic shield terminates away from the connection joint at a spanwise distance from the connection joint, the spanwise distance being 40 times or less the thickness of the first and second spar cap portions at the connection joint.

11. The wind turbine blade according to claim 1, wherein the connection joint comprises a mechanical jointed connection.

12. The wind turbine blade according to claim 1, wherein the connection joint comprises an adhesively bonded joint.

13. The wind turbine blade according to claim 1, further comprising a down conductor to transfer lightning current from a tip of the wind turbine blade to a root of the wind turbine blade.

14. The wind turbine blade according to claim 13, wherein the down conductor includes a lightning protection layer in the form of a conductive sheet adjacent an outer surface of the wind turbine blade, the lightning protection layer being separated from the first spar cap portion and the second spar cap portion by insulating material.

15. The wind turbine blade according to claim 13, wherein the down conductor is equipotentially bonded to the electromagnetic shield.

16. The wind turbine blade according to claim 1, wherein the electromagnetic shield comprises a metallic foil.

17. The wind turbine blade according to claim 1, wherein the electromagnetic shield comprises metallic wires incorporated into a glass fibre layer.

* * * * *